United States Patent [19]

Hattori et al.

[11] 4,424,322
[45] Jan. 3, 1984

[54] PROCESS FOR PRODUCING POLYMERS OR COPOLYMERS OF CONJUGATED DIENES

[75] Inventors: Yasuo Hattori; Takeshi Ikematu, both of Yokohama; Toshio Ibaragi, Kawasaki; Makoto Honda, Tokyo, all of Japan

[73] Assignee: Asahi Kasei Kogyo Kabushiki Kaisha, Osaka, Japan

[21] Appl. No.: 305,685

[22] Filed: Sep. 25, 1981

[30] Foreign Application Priority Data

Sep. 13, 1978 [JP] Japan ................................ 53-111632

[51] Int. Cl.$^3$ ............................................ C08F 4/10
[52] U.S. Cl. ..................................... 526/175; 526/173; 526/176; 526/177; 526/180; 526/181
[58] Field of Search ................ 526/173, 175, 180, 181

[56] References Cited

U.S. PATENT DOCUMENTS

| | | | |
|---|---|---|---|
| 3,629,213 | 12/1971 | Onishi | 526/181 |
| 3,847,883 | 11/1974 | Kamienski | 526/181 |
| 3,903,019 | 9/1975 | Hargis | 526/181 |
| 4,033,900 | 7/1977 | Hargis | 526/173 |
| 4,129,705 | 12/1978 | de Zarauz | 526/175 |
| 4,260,519 | 4/1981 | Aggarwal | 526/181 |

*Primary Examiner*—Paul R. Michl

*Attorney, Agent, or Firm*—Birch, Stewart, Kolasch & Birch

[57] ABSTRACT

A process for producing polymers of a conjugated diene, copolymers of a conjugated diene and another conjugated diene, or copolymers of conjugated diene and a vinyl aromatic hydrocarbon, which comprises polymerizing the corresponding monomers in the presence of a complex initiator consisting of components (a) and (b) described below, or (a) and (b) together with one or more components selected from components (c) and (d);

(a) An organic compound of barium, strontium or calcium;
(b) An organolithium-beryllium compound or an organolithiummagnesium compound;
(c) An organolithium compound, an organoberyllium compound or an organomagnesium compound; and
(d) An organoaluminum compound or an organozinc compound.

The polymers of a conjugated diene containing relatively high trans-1,4 linkage, or the copolymers of a conjugated diene and a vinyl aromatic compound highly randomized and having high bound styrene and high trans-1,4 linkage can be produced at good yields.

8 Claims, No Drawings

PROCESS FOR PRODUCING POLYMERS OR COPOLYMERS OF CONJUGATED DIENES

This application is a continuation of copending application Ser. No. 72,370, filed on Sept. 4, 1979, now abandoned.

BACKGROUND OF THE INVENTION

The present invention relates to a process for producing polymers or copolymers of a conjugated diene having a relatively high content of trans-1,4 linkage, using a novel complex initiator.

It has been conventionally well known that conjugated dienes are highly stereoregularly polymerized by the so-called Ziegler catalysts which comprises transition metal compounds of nickel, cobalt, titanium or vanadium and the like as main components. If it is desired to obtain a polymer having a high content of trans-1,4 linkage, a catalyst containing a vanadium compound as the main component may be generally used. In that case, a polymer, such as butadiene polymer, with a trans-1,4 linkage content of from 90 to 95% is readily available. Transpolybutadiene having such high stereoregularity, however, exhibits strong crystallinity at room temperature, and exhibits characteristics as a thermoplastic resin rather than as a rubber elastomer. It is thus used as the skin of golf balls, but never has been used as rubber, such as rubber material for tires.

On the other hand, there is no high stereoregularity in the diene polymer obtained by the so-called anionic polymerization by means of organolithium compounds. Butadiene polymer, for example, generally shows the following microstructure:

| Trans-1,4 linkage | 50–55% |
| Cis-1,4 linkage | 35–40% |
| 1,2-Vinyl linkage | 10–15% |

Unlike the use of above described Ziegler catalysts, the above initiator makes it practically possible to polymerize not only a diene, but also to copolymerize a diene with a vinyl aromatic hydrocarbon. However, because of a large difference in the reactivity between the diene and the vinyl aromatic hydrocarbon, the copolymerization of these two components by use of the above initiators has required various measures to obtain a copolymer in which both components are copolymerized completely at random.

As the methods of obtaining completely random copolymers of the conjugated diene and the vinyl aromatic hydrocarbon, there are known methods in which polar compounds such as ether or thioether are added to the polymerization system, and other methods in which polymerization is carried out in the presence of an organic compound of alkali metals other than lithium, such as potassium (U.S. Pat. No. 3,294,768).

These methods are effective as a randomizer for copolymerization of a diene and a vinyl aromatic compound, but at the same time, they result more or less in the increase of 1,2- or 3,4-linkage, which usually gives rise to a higher glass transition temperature of polymers or copolymers of conjugated dienes and is not desirable for some uses thereof.

Still another method is also known in which a system with an organolithium compound as the initiator is polymerized in the presence of a barium compound such as barium di-tert-butoxide (U.S. Pat. No. 3,629,213). According to this method, the copolymerization of a conjugated diene and a vinyl aromatic compound is randomized without increasing the 1,2- or 3,4-linkage. However, in the case of polybutadiene obtained by the polymerization in cyclohexane which is a preferred solvent due to less extent of decrease in molecular weight of polymers, the content of trans-1,4 linkage is about 68% at the maximum. This polybutadiene exhibited no particular superiority in physical properties and in processability of both the unvulcanized compound and the vulcanized rubber, as compared with the polybutadiene obtained by using an organolithium compound alone.

Recently, there have become known those initiators which provide high content of trans-1,4 linkage and which also in some cases bring about the randomization in copolymerization of a conjugated diene and a vinyl aromatic compound. These initiators are as follows, respectively.

(a) A complex consisting of (1) barium t-alcoxide and (2) dibutylmagnesium (U.S. Pat. No. 3,846,385);

(b) A complex cocatalyst consisting of (1) an organolithium, (2) a barium or strontium compound, and (3) an organometallic compound of Group IIB or IIIA of the Periodical Table (U.S. Pat. No. 4,080,492);

(c) A complex of (1) an organolithium and (2) a barium compound of the formula:

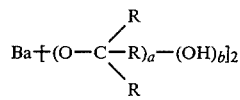

(U.S. Pat. No. 3,992,561);

(d) A complex of (1) organolithium and (2) Me[MR$^1$R$^2$R$^3$R$^4$]$_2$ or Me[M'(R')$_4$] wherein Me represents Ba, Ca, Sr or Mg; M represents B or Al; and M' represents Zn (G.B. 1,516,861); and (e) A complex consisting of (1) an organolithium, (2) a Ba, Sr or Ca compound, (3) an organometallic compound of Group IIB or IIIA of the Periodical Table, and (4) an alkali metal alcoholate (G.B. No. 1,525,381).

The butadiene polymers obtained by the use of these initiators have a trans-1,4 linkage content of about 65–85%, which exhibits a high green strength as the rubber raw material for tires.

However, the methods of using these initiators have some defects which are individually different in types but equally troublesome in commercialization. In the method using the initiator (a), above, the respective components by which the complex is organized are less soluble in hydrocarbon solvents, and therefore, particularly only the limited kinds of the magnesium compounds are used. In addition, the initiator has a relatively low activity of polymerization. In the methods using the initiators (c) and (d), the complexes of Ba or other compounds require such complicated procedures for preparation, that in some cases the reproducibility of the complexes cannot be expected owing to the quite weak activity thereof, for instance. The catalysts themselves are not considered to have sufficient performance in balancing of the increase of the trans linkage and that of their polymerization activities (polymerization speeds).

The initiators (b) and (e) are, among these complex catalysts, easier to prepare, and the catalyst components have sufficient solubility in hydrocarbon solvents. From these points of view, (b) and (e) may be considered the most preferable catalysts. However, as described in Examples of the specification, the initiator (b) requires an increased amount of the organometallic compound of Group IIB or IIIA of the Periodical Table to be employed, in order to obtain a relatively high trans content. The polymers thus obtained had the drawbacks of decreased molecular weight (as shown by intrinsic viscosities) and lowered copolymerizability with styrene.

The method using the initiator (e) has been proposed to improve these drawbacks. This method has indeed improved the drawbacks of (b), but is not sufficient. Especially the copolymerizability with styrene has not fully been improved. In addition, this method requires quite a large quantity of total catalyst (expressed as a sum of all catalyst components) to produce unit weight of polymer. Commercialization of this method, therefore, not only possesses a problem of economic efficiency, but also creates another new problem that the catalyst residue must be removed from the polymer.

By using a novel initiator characterized in that it can be prepared by simply combining catalyst components, all of which are fully soluble in hydrocarbon solvents, this invention improves the above-described drawbacks of prior art and can produce at good yields the polymers of a conjugated diene containing relatively high trans-1,4 linkage. In the copolymerization of a conjugated diene and a vinyl aromatic compound, likewise, the randomness of the copolymer is improved, and the copolymer containing high bound styrene and trans-1,4 linkage can be readily produced.

SUMMARY OF THE INVENTION

It is, therefore, an object of the present invention to provide a process for producing polymers or copolymers of a conjugated diene having a relatively high content of trans-1,4 linkage using a novel complex initiator.

Accordingly, the present invention is to provide a process for producing polymers of a conjugated diene, copolymers of a conjugated diene and another conjugated diene, or copolymers of conjugated diene and a vinyl aromatic hydrocarbon, which comprises polymerizing the corresponding monomers in the presence of a complex initiator consisting of components (a) and (b) described below, or (a) and (b) together with one or more components selected from components (c) and (d);

(a) An organic compound of barium, strontium or calcium;
(b) An organolithium-beryllium compound or an organolithium-magnesium compound;
(c) An organolithium compound, an organoberyllium compound or an organomagnesium compound; and
(d) An organoaluminum compound or an organozinc compound.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF PREFERRED EMBODIMENT

Examples of conjugated dienes according to the present invention may be 1,3-butadiene, isoprene, 2,3-dimethyl-1,3-butadiene, 1,3-pentadiene, 2,4-hexadiene, 2-phenyl-1,3-butadiene, and 1-phenyl-1,3-butadiene.

Examples of the vinyl aromatic compounds according to the present invention may be styrene, divinylbenzene, vinyltoluene, 1-vinylnaphthalene, α-methylstyrene, and methoxystyrene.

The most preferred and practical forms of polymerization according to the present invention are polymerization of butadiene alone, butadiene-isoprene or butadiene-styrene copolymerization, and terpolymerization of butadiene-isoprene-styrene.

All the initiator components according to the present invention are soluble in hydrocarbon solvents, and polymerization is readily operated without requiring any complicated preparative procedure.

The first component (a) of the novel complex initiator according to the present invention, i.e., an organic compound of barium, strontium or calcium, can be represented by the following formulae:

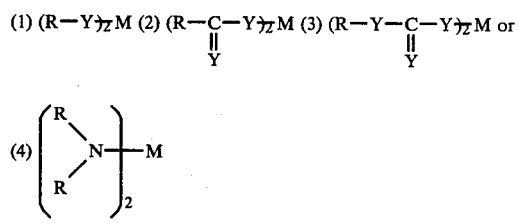

wherein R is a hydrogen radical selected from the group consisting of aliphatic, alicyclic or aromatic hydrocarbons; Y is an oxygen atom or a sulfur atom; and M is barium, strontium or calcium.

Examples of these compounds may be the barium, strontium or calcium salts of the following compounds: namely, ethyl alcohol, n-propyl alcohol, isopropyl alcohol, tert-butyl alcohol, n-hexyl alcohol, cyclohexyl alcohol, allyl alcohol, cyclopentenyl alcohol, benzyl alcohol, phenol, catechol, 1-naphthol, 2,6-di-tert-butylphenol, nonylphenol, 4-phenylphenol, ethanethiol, 1-butanethiol, thiophenol, cyclohexanethiol, 2-naphthalenethiol, caprylic acid, lauric acid, myristic acid, palmitic acid, stearic acid, oleic acid, linolic acid, linoleic acid, naphthoic acid, benzoic acid, hexanethionic acid, decanethionic acid, tridecanethionic acid, thiobenzoic acid, acid tert-butyl carbonate, acid hexyl carbonate, acid phenyl carbonate, acid thio-tert-butyl carbonate, dimethylamine, diethylamine, di-n-butylamine, and the like.

The second component (b) of the initiator according to the present invention, i.e., an organolithiumberyllium or organolithiummagnesium compound, can be obtained by the reaction of an organolithium with an organoberyllium compound, or the reaction of an organolithium with an organomagnesium compound. It is preferred from the aspect of solubility in solvents that the organolithiumberyllium or organolithiummagnesium compound by this reaction is formed in advance, prior to mixing it with the organic compound of Ba, etc., which is the first component of the initiator or prior to adding it to the polymerization system. If the organolithium compound and the organoberyllium or organomagnesium compound are fully soluble, both compounds may be used separately without forming the second component in advance. Preferably both compounds are reacted at a molar ratio of 1:1, but not limited thereto. There may be present, therefore, unreacted organolithium, organoberyllium or organomagnesium compound. Thus, in addition to the above two components (a) and (b), the initiator of this invention may contain the third component (c) which is an organolithium, organoberyllium or organomagnesium compound.

The organolithium compound which is used as the third component (c) of the initiator according to the present invention can be represented by the following formula:

$$R(Li)_n$$

wherein R is selected from the group consisting of aliphatic, alicyclic or aromatic hydrocarbon radicals; and n is an integer of from 1 to 4.

Examples of the organolithium compound may be ethyllithium, n-propyllithium, isopropyllithium, n-butyllithium, iso-amyllithium, sec-amyllithium, n-hexyllithium, n-octyllithium, allyllithium, n-propenyllithium, isobutenyllithium, benzyllithium, phenyllithium, 1,1-diphenyllithium, tetramethylenedilithium, pentamethylene-dilithium, hexamethylene-dilithium, 1,5-dilithium-naphthalene, 1,4-dithithiocyclohexane, polybutadienyl-lithium, polyisobutenyllithium, polystyryllithium, and the like.

The organomagnesium and organoberyllium compounds which also is used as the third component (c) of the initiator can be represented by the following formulae:

$$R_2M' \quad (1)$$

and $$RM'X \quad (2)$$

wherein R is selected from the group consisting of aliphatic, alicyclic or aromatic hydrocarbon radicals; X is a halogen atom; and M' is a magnesium atom or a beryllium atom.

Examples of the organoberyllium compound are diethylberyllium, di-n-propylberyllium, di-isopropylberyllium, di-n-butylberyllium, di-tert-butylberyllium, di-n-hexylberyllium, di-n-propenylberyllium, diphenylberyllium, ethylberyllium chloride, n-propenylberyllium chloride, isopropylberyllium chloride, n-butylberyllium chloride, n-butylberyllium bromide, tert-butylberyllium chloride, n-propenylberyllium chloride, phenylberyllium chloride, and the like.

Examples of the organomagnesium compound are diethylmagnesium, di-n-propylmagnesium, di-isopropylmagnesium, di-n-butylmagnesium, di-tert-butylmagnesium, di-n-hexylmagnesium, di-n-propenylmagnesium, diphenylmagnesium, ethylmagnesium chloride, n-propenylmagnesium chloride, isopropylmagnesium chloride, n-butylmagnesium chloride, n-butylmagnesium bromide, tert-butylmagnesium chloride, phenylmagnesium chloride, and the like.

In addition to (a) and (b), or (a), (b) and (c), the initiator according to the present invention may contain one more component (d) which is an organoaluminum or organozinc compound. In some cases, such an initiator is even preferred. The organoaluminum or organozinc compound often works effectively, especially when the polymerization system contains small amounts of impurities, e.g., water, oxygen, ether or various olefines or allenes.

The organoaluminum or organozinc compound used can be represented by the following formulae:

$$R_{3-m}AlX'_m \quad (1)$$

or $$R_{2-l}ZnX'_l \quad (2)$$

wherein R is selected from the group consisting of aliphatic, alicyclic or aromatic hydrocarbon radicals; X' is a hydrogen atom or a halogen atom; m is an integer of zero, one or 2; and l is an integer of zero or one.

Examples of such compounds are triethylaluminum, triisobutyl aluminum, diethylaluminum chloride, diethylaluminum hydride, diisobutylaluminum hydride, diethylzinc, di-n-butylzinc, and the like.

The amounts of initiator components used are widely varied, depending upon the purpose, methods, or conditions of polymerization. It is generally preferred to use them in the following ranges:

Component (a): 0.005 to 50 mmol per 100 g of total monomers.

Component (b): 0.1 to 10 moles per mole of component (a).

Component (c): 0 to 3 moles per mole of component (b).

Component (d): 0 to 10 mmol per 100 g of total monomers.

If the rubber raw material for tires is aimed at, it is especially preferred to use the components in the following ranges:

Component (a): 0.01 to 1.0 mmol per 100 g of total monomers.

Component (b): 0.4 to 5 moles per mole of component (a).

Component (c): 0 to 2 moles per mole of component (b).

Component (d): 0 to 1.0 mmol per 100 g of total monomers.

Although the polymerization using the initiator according to the present invention may be carried out in bulk, it is generally preferred to carry out solution polymerization in hydrocarbon solvents. Examples of preferred solvents are propane, butane, pentane, hexane, heptane, octane, decane, cyclohexane, cyclooctane, benzene, toluene, xylene, ethylbenzene and mixtures thereof.

These solvents, in some cases, may contain small amounts of polar compounds, such as tetrahydrofuran, diethylether, dimethylether, and various amine compounds.

The amount of solvent used in the polymerization varies depending upon the type and molecular weight of the polymer to be produced. It is generally preferred that the amount is in the range of from 300 to 1,000 parts by weight per 100 parts by weight of monomers.

The temperature of polymerization using the present catalyst composition is preferably −40° C. to 160° C., and most preferably 40° C. to 120° C. As for the atmosphere under which polymerization is conducted, it is preferred that air is replaced by an inert gas such as nitrogen, argon gas, etc. It is further preferred to avoid incorporation of those compounds such as, e.g., water, halogen compounds, and oxygen, which would react with the organometals, into the polymerization system.

The following examples will further illustrate the process of the present invention, but are not to be construed as limiting.

advantageous to mix the organolithium compound with the organomagnesium compound in advance to form a complex, rather than adding both compounds separately. Furthermore, effectiveness of the existence of component (c) will be readily understood from the results given in Table 1.

TABLE 1

| | Initiator components*1 | | | | | Microstructures of polymers*2 | | |
|---|---|---|---|---|---|---|---|---|
| | (a) Barium dionyl phenoxide (mmol) | (b) Lithium magnesium tributyl (mmol) | (c) Lithium butyl (mmol) | (c) Magnesium dibutyl (mmol) | Yield (%) | Intrinsic viscosity | Trans-1,4 linkage (%) | Cis-1,4 linkage (%) | 1,2-vinyl (%) |
| Ex. | | | | | | | | | |
| 1 | 0.125 | 0.25 | — | — | 93 | 1.6 | 75 | 18 | 7 |
| 2 | 0.125 | — | 0.25 | 0.25 | 91 | 1.5 | 73 | 19 | 8 |
| 3 | 0.125 | 0.125 | 0.125 | — | 90 | 1.5 | 69 | 21 | 10 |
| 4 | 0.125 | 0.125 | — | 0.125 | 91 | 1.6 | 75 | 18 | 7 |
| Com. Ex. | | | | | | | | | |
| 1 | 0.125 | — | — | 0.25 | 67 | 1.4 | 75 | 17 | 8 |
| 2 | 0.125 | — | 0.5 | — | 85 | 1.5 | 58 | 32 | 10 |
| 3 | — | — | 0.25 | 0.25 | 100 | 1.6 | 53 | 36 | 11 |
| 4 | — | — | — | 0.5 | 0 | — | — | — | — |
| 5 | — | — | 0.5 | — | 100 | 1.3 | 52 | 35 | 13 |

Footnotes to Table 1
*1Mmol per 100 grams of monomers.
*2Calculated from infrared absorption spectra by Morero method.

EXAMPLES 1 TO 4

Into a 1-liter pressure resistant glass bottle filled with dry nitrogen, 100 grams of 1,3-butadiene and 400 grams of n-hexane as the solvent were charged. The initiator of the present invention was then added according to the types and amounts of components shown in Table 1, and polymerization was carried out at 50° C. for 7 hours. The microstructures, yields and intrinsic viscosities of the polymers thus obtained are shown in Table 1. To compare with these results, conventionally published initiators were used in comparative examples, results of which are also shown in Table 1.

As shown in Table 1, the initiator of the present invention containing as component (b) an organolithium-magnesium compound soluble in hydrocarbon solvents is found to give with higher yields polymers having higher contents of trans-1,4 linkage at a polymerization degree sufficient to put the polymers in practical use, as compared with the initiators of published art shown in comparative examples. A comparison among Examples indicates that for component (b), it is somewhat more

EXAMPLES 5 TO 9

Examples 5 to 9 were carried out in the similar way as in Examples 1–4. Results are given in Table 2. Examples 5 to 7 show the effects of varied amounts and ratios of components (a) and (b) of the initiator. It has thus been shown that the intrinsic viscosity of polymer is controlled by the amount of component (a) and that a ratio of (b) to (a) of nearly 1 results in a combination of a high yield and a high content of 1,4 linkage. Examples 8 and 9 indicates the effects of aluminum triethyl added as the component (d) of the present initiator. Table 2 shows that addition of aluminum triethyl increases the content of trans-1,4 linkage to some extent, although it somewhat decreases the yield and the polymerization degree.

Comparative examples 6 to 8 show the effects of addition of aluminum triethyl within the scope of prior art and, in addition, a polar compound such as lithium alcoholate ether. Regardless of the existence of a component (d) such as aluminum triethyl, the present invention is shown to be superior to prior art in view of the balance of the yield and the amount of trans-1,4 linkage.

TABLE 2

| | Initiator components | | | | | | Microstructures of polymers | | |
|---|---|---|---|---|---|---|---|---|---|
| | (a) Barium dionyl phenoxide (mmol) | (b) Lithium magnesium tributyl (mmol) | (c) Lithium butyl (mmol) | (d) Aluminum triethyl (mmol) | Yield (%) | Intrinsic viscosity | Trans-1,4 linkage (%) | Cis-1,4 linkage (%) | 1,2-vinyl (%) |
| Ex. | | | | | | | | | |
| 5 | 0.5 | 0.25 | — | — | 90 | 1.1 | 73 | 20 | 7 |
| 6 | 0.25 | 0.25 | — | — | 90 | 1.5 | 75 | 17 | 8 |
| 7 | 0.063 | 0.25 | — | — | 85 | 1.8 | 75 | 18 | 7 |
| 8 | 0.125 | 0.125 | 0.125 | 0.25 | 84 | 1.5 | 78 | 15 | 7 |
| 9 | 0.125 | 0.25 | — | 0.5 | 80 | 1.3 | 80 | 14 | 6 |
| Com. Ex. | | | | | | | | | |
| 6 | 0.125 | — | 0.25 | 0.5 | 64 | 1.2 | 80 | 13 | 7 |
| 7 | 0.125 | — | *2 | 0.5 | 52 | 1.0 | 82 | 12 | 6 |

TABLE 2-continued

| | Initiator components | | | | | Microstructures of polymers | | |
|---|---|---|---|---|---|---|---|---|
| | (a) Barium dionyl phenoxide (mmol) | (b) Lithium magnesium tributyl (mmol) | (c) Lithium butyl (mmol) | (d) Aluminum triethyl (mmol) | Yield (%) | Intrinsic viscosity | Trans-1,4 linkage (%) | Cis-1,4 linkage (%) | 1,2-vinyl (%) |
| 8 | 0.125 | — | 0.25 | 0.5*[1] | 75 | 1.4 | 85 | 10 | 5 |

Footnotes to Table 2
*[1]Lithium alcoholate ether $C_2H_5(OCH_2CH_2)_2OLi$ (0.25 mmol) was further added as a component (e).
*[2]Lithium butyl was replaced by 0.25 mmol of magnesium dibutyl.

EXAMPLES 10 TO 11

Examples 10 and 11 were carried out in the similar way as in Examples 1 to 4. A strontium or calcium compound was used in place of the barium compound as a component (a) of the initiator. Results are shown in Table 3. Respective yields were similar extent to the case of barium used, but the polymer obtained had somewhat different microstructures from that obtained by using the barium compound. Especially in the case of calcium used, the polymer of relatively high 1,2-vinyl linkage was produced.

TABLE 3

| | Initiator components | | | | | Microstructures of polymers | | |
|---|---|---|---|---|---|---|---|---|
| | (a) Strontium dinonyl phenoxide (mmol) | (a) Calcium dinonyl phenoxide (mmol) | (b) Lithium magnesium tributyl (mmol) | Yield (%) | Intrinsic viscosity | Trans-1,4 linkage (%) | Cis-1,4 linkage (%) | 1,2-vinyl (%) |
| Ex. 10 | 0.25 | — | 0.5 | 91 | 1.4 | 73 | 20 | 7 |
| 11 | — | 0.25 | 0.5 | 94 | 1.6 | 69 | 17 | 14 |

EXAMPLES 12 TO 14

Examples 12 to 14 were carried out in the similar way as in Examples 1 to 4, and the results were shown in Table 4. These Examples made use of lithiumberyllium-butyldiethyl as the component (b) of the initiator. It has been found that the use of this compound, like the use of lithiummagnesium tributyl, provides also a polymer containing high trans-1,4 linkage.

Effects of the existence of component (c) on the barium-containing system can be understood by these experiments; that is, the existence of the component (c) causes the yield and the trans-1,4 linkage to decrease to some extent.

These Examples clarify the differences between the beryllium complex and the magnesium complex in component (b). Although the beryllium complex brings about somewhat a lower yield than the magnesium complex does, the former brings about relatively higher trans-1,4 linkage than the magnesium complex does.

TABLE 4

| | Initiator components*[1] | | | | | | Microstructures*[2] of polymers | | |
|---|---|---|---|---|---|---|---|---|---|
| | (a) Barium dinonyl phenoxide (mmol) | (b) Lithium beryllium butyldiethyl (mmol) | (c) Lithium butyl (mmol) | (c) Beryllium diethyl (mmol) | Yield (%) | Intrinsic viscosity | Trans-1,4 linkage (%) | Cis-1,4 linkage (%) | 1,2-vinyl (%) |
| Ex. 12 | 0.125 | 0.25 | — | — | 89 | 1.5 | 84 | 12 | 4 |
| 13 | 0.125 | 0.125 | 0.125 | — | 87 | 1.4 | 75 | 20 | 5 |
| 14 | 0.125 | 0.125 | — | 0.125 | 74 | 1.2 | 78 | 18 | 4 |

Footnotes to Table 4
*[1] and *[2] Same as in Table 1.

EXAMPLE 15

Example 15 was carried out in the same way as in Example 1, except that monomers comprising a mixture of 75 grams of 1,3-butadiene and 25 grams of styrene were substituted for the monomers used in Example 1. Results are shown in Table 5, together with the results of comparative examples 9, 10 and 11 which were similarly carried out using the initiators of prior art the same initiators as used in comparative examples 5, 6 and 8). As shown in Table 5, the initiator of the present invention is found not only to provide high trans-1,4 linkage as the microstructure of the butadiene portion, but also to be effective in randomization of styrene copolymerization, as can be understood from the value of the block styrene content.

As apparent from the comparison with the comparative examples 10 and 11, the present invention provides better yields of products than the well known processes of prior art do. Not only that, but further it increases the randomness of styrene-butadiene copolymerization, as well. And copolymers containing highly bound styrene can be easily produced.

TABLE

| | Initiator components | Yield (%) | Intrinsic viscosity | Bound styrene content (%) | Block styrene content*1 (%) | Microstructures of polymers | | |
|---|---|---|---|---|---|---|---|---|
| | | | | | | Trans-1,4 linkage (%) | Cis-1,4 linkage (%) | 1,2-vinyl (%) |
| Ex. 15 | Same as Ex. 1 | 88 | 1.4 | 20 | 0 | 76 | 18 | 6 |
| Com. Ex. 9 | Same as Com. Ex. 5 | 99 | 1.5 | 24 | 18 | 53 | 35 | 12 |
| Com. Ex. 10 | Same as Com. Ex. 6 | 60 | 1.0 | 7 | 0 | 79 | 14 | 7 |
| Com. Ex. 11 | Same as Com. Ex. 8 | 70 | 1.4 | 11 | 0 | 83 | 11 | 6 |

Footnote to Table 5
*1 According to the oxidation decomposition method by I. M. Kolthoff, et al., Journal of Polymer Science, Vol. 1, p.p. 429–433 (1946).

"The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A process for producing in high yield polymers having a high content of trans-1,4-linkage of a conjugated diene, copolymers of a conjugated diene and another conjugated diene, or copolymer of conjugated diene and a vinyl aromatic hydrocarbon, which comprises polymerizing the corresponding monomers in the presence of a complex initiator consisting of components (a) and (b) described below, or (a) and (b) together with one or more components selected from components (c) and (d); wherein (a) comprises a barium, strontium or calcium compound specified by the following formulae:

(1) $(R-Y-)_2M$  (2) $(R-\underset{\underset{Y}{\|}}{C}-Y-)_2M$  (3) $(R-Y-\underset{\underset{Y}{\|}}{C}-)_2M$  or (4) $\left(\underset{R}{\overset{R}{\diagdown}}N-\right)_2 M$ wherein R is a hydrocarbon radical selected from the group consisting of aliphatic alicyclic or aromatic hydrocarbons; Y is an oxygen atom or a sulfur atom; and M is barium, strontium or calcium; (b) comprises a reaction product of an organolithium compound and at least one compound of the group consisting of the organomagnesium and organoberyllium compound each reactant specified by the following formulae, respectively:

$$[R(Li)_n]R(Li)_n$$

wherein R is selected from the group consisting of aliphatic, alicyclic or aromatic hydrocarbon radicals; and n is an integer of from 1 to 4; and $$R_2M' \quad (1)$$

and $$RM'X \quad (2)$$

wherein R is selected from the group consisting of aliphatic, alicyclic or aromatic hydrocarbon radicals; X is a halogen atom; and M' is a magnesium atom or a beryllium atom;

(c) comprises an organolithium compound, an organomagnesium compound or an organoberyllium compound specified by the following formulae, respectively:

$$[R(Li)_n]R(Li)_n$$

wherein R is selected from the group consisting of aliphatic, alicyclic or aromatic hydrocarbon radicals and n is an integer of from 1 to 4; and $$R_2M' \quad (1)$$

and $$RM'X \quad (2)$$

wherein R is selected from the group consisting of aliphatic, alicyclic or aromatic hydrocarbon radicals; X is a halogen atom; and M' is a magnesium atom or a beryllium atom; and (d) comprises an organoaluminum compound or an organozinc compound specified by the following formulae, respectively:

$$R_{3-m}AlX'_m \text{ or } R_{2-l}ZnX'_l \quad (1)$$

wherein R is selected from the group consisting of aliphatic, alicyclic or aromatic hydrocarbon radicals; X' is a hydrogen atom or a halogen atom; m is an integer of zero, one or 2; and l is an integer of zero or one.

2. A process according to claim 1, wherein the complex initiator consists essentially of component (a) and (b).

3. A process according to claim 1, wherein said conjugated dienes are 1,3-butadiene and/or isoprene and wherein said vinyl aromatic compound is styrene.

4. A process according to claim 2, wherein said component (a) is an alcoxide compound of barium.

5. A process according to claim 2, wherein said component (b) is lithiumberyllium trialkyl or or lithiummagnesium trialkyl.

6. A process according to claim 1, wherein said component (c) is lithium alkyl, beryllium dialkyl or magnesium dialkyl.

7. A process according to claim 1, wherein said component (d) is aluminum trialkyl or zinc dialkyl.

8. The process according to claim 1, wherein said component (a) is selected from at least one member of the group consisting of barium, strontium and calcium dinonyl phenoxide and component (b) is selected from at least one member of the group consisting of lithium magnesium tributyl and lithium beryllium butyl diethyl.

* * * * *